UNITED STATES PATENT OFFICE.

ADOLPH D. FEST, OF CHICAGO, ILLINOIS.

PROCESS FOR MAKING LIME-SULFUR COMPOUNDS AND SOLUTIONS.

1,186,564.      Specification of Letters Patent.      Patented June 13, 1916.

No. Drawing.      Application filed August 8, 1914. Serial No. 855,799.

*To all whom it may concern:*

Be it known that I, ADOLPH D. FEST, a subject of the Emperor of Austria-Hungary, residing in Chicago, county of Cook, and State of Illinois, have invented certain new and useful Improvements in Processes for Making Lime-Sulfur Compounds and Solutions, of which the following is a specification.

My invention relates to compounds of lime and sulfur, and solutions of such compounds adapted to be employed as germicides, insecticides and for various other purposes, and notably as a dip or bath for removing scab, lice and other vermin from cattle and sheep.

The older process for making the wash consists in boiling calcium oxid CaO and sulfur S in an open kettle, with stirring, which results in certain chemical reactions yielding, among other things, calcium tetrasulfid $CaS_4$, and calcium thiosulfate $CaS_2O_3$, which are soluble and constitute the principal ingredients of the wash. A very notable disadvantage in the process heretofore employed is in the comparatively small yield per unit of CaO and S used, which is largely due to the oxidation, by contact with the atmosphere (both during the boiling and subsequent cooling), of the calcium thiosulfate as well as of the polysulfid formed during the boiling process, the oxidation of the polysulfid first resulting in thiosulfate, and the oxidation of thiosulfate (formed during the original reactions due to boiling as well as by the oxidation of the polysulfid) results in the formation of calcium sulfite, $CaSO_3$, which is precipitated, together with usually a quantity of free sulfur. This precipitate amounts to from 10 to 30% of the original quantity of calcium oxid and sulfur, in ordinary practice, and may amount to 40% or more.

The objects of the present invention are primarily to overcome much, if not substantially all, of the loss referred to, thereby producing a larger yield of wash per unit of ingredients; and also to provide a concentrated form of soluble calcium polysulfid and calcium thiosulfate, and a form which is more stable than the hitherto known solution form, and one which may be packed in relatively small containers which may be suitably sealed to prevent the breaking down of the compounds, and which may be shipped and stored while occupying relatively small space, as well as being of relatively light weight per unit of efficiency; and to provide a process which is simple of practice and economic from the standpoint of the process as well as from that of the product or result.

A particular object is to provide lime-sulfur compounds in substantially solid or paste form.

Other objects will appear hereinafter.

The practice of my present invention contemplates the exclusion, or substantially the exclusion of an oxidizing agent during the necessary reactions, except such oxidizing factors as exist in the ingredients themselves or arise from their reactions in the presence of some water, thus preventing the oxidation of the valuable polysulfid and the formation of the precipitate calcium sulfite $CaSO_3$. It also contemplates the possibility of using a materially smaller quantity of free sulfur than has heretofore been ordinarily used, namely the use of not materially more than is required for the reactions, and without the excess of sulfur heretofore generally employed. To this end I preferably heat the ingredients in the presence of a comparatively small amount of water in an autoclave or steam-tight treating receptacle having a suitable door or cover adapted to permit the materials to be placed within the treating chamber, and having means for the introduction of live steam to and from the interior of the same. The treating receptacle may be of the steam-jacketed type, in which live steam is conducted to a chamber surrounding the kettle or inner chamber containing the ingredients; or it may be of the simple type in which live steam is conducted directly into contact with the mass. Agitation of the contents may be had by means of revolving paddles actuated from the outside.

As such heating receptacles are well known in various arts it will not be necessary to illustrate the same, as in view of these teachings persons skilled in the art will readily adopt any one of a considerable number of types of such steam heating vessels according to the capacity desired or other conditions incident to the desired use.

In a typical example within the scope of the invention, I mix the ingredients substantially in the proportion of 3 molecules of calcium oxid (CaO) to 10 atoms of sulfur (S) and not less than about 12 molecules of water; or, expressed in terms of weight, substantially in the proportion of 168 pounds of calcium oxid to 320 pounds of sulfur and at least 216 pounds of water. These proportions give a mixture of pasty consistency. This pasty mixture is placed in a suitable heating chamber, hereinabove described, and the chamber closed. Live steam is then turned on, which may be at any suitable pressure adapted to bring the mass to the temperature where the reactions completely take place, and in order to drive atmospheric air from the treating chamber I preferably open a discharge valve whereby for a short interval air and steam may issue from the tank. This discharge valve is then closed. I have employed very satisfactorily a steam pressure of thirty pounds per square inch in a form of heating chamber where the steam is applied directly to the mixture, that is, where the treating vessel consists merely of a steam-tight hollow cylinder in which the mixture is placed. The heating should be continued until all the desired reactions have been completed, which will necessarily vary with the quantity of material treated, or with the pressure. In this regard persons skilled in the art will readily determine the required duration of the heat in view of the mass of ingredients, the pressure being employed, as well as the heating efficiency of the particular treating cylinder used. If the temperature is maintained at substantially 212 F. the time necessary for the reactions would be from three quarters of an hour to one hour as heretofore; but since by steam pressure a somewhat higher temperature may be suitably maintained, the time necessary to complete the reactions may be reduced. A continuance of the heat for longer than is actually necessary in my present process will do no harm, although in the older process the longer the heating is continued the more the objectionable oxidation takes place.

As the calcium thiosulfate and the polysulfid are not changed by the live steam the waste and loss hereinabove referred to are overcome and we have now a substantially solid or crystallized mass consisting of polysulfid, thiosulfate and water and which constitutes a highly concentrated form of the valuable ingredients of the wash, and one which, on cooling, is quite stable. This product is well adapted to be placed in any suitable container and shipped or stored for use where and as desired, and it is only necessary to take a quantity of this concentrated mixture and dilute it with water when the insecticidal application is to be made.

According to common practice the final solution for application to cattle should be of a strength not less than 2% of soluble sulfid sulfur, and not less than 1½% of soluble sulfid sulfur for sheep. The suitable strength of the solution for various other purposes is also well known.

After taking the product from the treating cylinder I preferably pass the same through a suitable mill, reducing the crystals to relatively small proportions and giving the mass a still more mushy or pasty consistency. In this finely divided state it naturally dissolves more readily when forming the wash.

While I prefer to employ the steam process as hereinabove set forth, the desired results may be obtained effectively by heating the calcium compound with sulfur and water in a treating chamber from which the atmospheric air has been substantially exhausted, as by means of a suction pump, the mass being preferably heated in such case by steam coils, or by free steam in a heating chamber surrounding the air-tight tank or receptacle containing the mixture. Of course, if the mixture-containing receptacle be substantially filled with the mixture it is obvious that very little air would be available for the objectionable oxidation hereinabove pointed out; but if there be considerable open space in the tank or receptacle above the surface of the mixture a substantial vacuum should be produced in order to reduce the objectionable oxidation to the minimum.

Heretofore many attempts have been made to produce lime-sulfur compounds in concentrated form suitable for subsequent dilution but without success, so far as I am able to learn, the maximum concentration being about thirty-three degrees Baumé only. It is possible that in some instances the degree of concentration may have gone as high as thirty-five degrees Baumé, but this latter degree would necessarily be the limit of concentration in the open kettle process, and I am not aware that anyone using an autoclave has ever considered it possible to complete the reactions with a less quantity of water than is necessary in the open kettle process. According to my present invention or discovery it is possible to produce such compounds with any degree of concentration desired, and in some of the following claims I have specified a concentration of forty degrees Baumé or over as being sufficiently far removed from prior practices to establish clearly the novelty of the invention of these claims.

The invention is not limited to the exact proportion of ingredients nor to the ingredients themselves hereinabove pointed out, nor to the employment of the suggested apparatus for practising the same, as some departures from these details will occur to persons skilled in the art all within the scope of the invention disclosed.

Reference should be had to the appended claims to determine the scope of the improvements herein set forth.

I claim:

1. The process of making soluble insecticidal compounds of sulfur which comprises mixing with sulfur a basic compound capable of reacting with sulfur to produce a soluble sulfid, and heating the mixture under non-oxidizing conditions and in the presence of a relatively small quantity of water, the quantity of water being so limited and the conditions of operation being such that the resulting product is highly concentrated to forty degrees Baumé or over and is adapted for dilution to suitable spraying strength.

2. The process of making soluble insecticidal compounds of sulfur which comprises mixing with sulfur a calcium compound capable of reacting with sulfur to produce soluble lime-sulfur compounds in the presence of water in quantity substantially limited to form a pasty mixture, and heating said mixture, while substantially excluding atmospheric air, until the desired reactions have been effected.

3. The process of making soluble insecticidal compounds of sulfur which comprises mixing lime with sulfur and sufficient water to form a pasty mixture, and heating said mixture, while substantially excluding atmospheric air, until the desired reactions have been effected.

4. The process of making soluble insecticidal compounds of sulfur which comprises mixing lime with sulfur and sufficient water to form a pasty mixture, and treating said mixture with steam under pressure in a closed chamber to effect the desired reactions.

5. The process of making an insecticidal compound which comprises mixing reacting proportions of lime and sulfur with water, and heating such mixture under substantial exclusion of air to effect the desired reactions, the quantity of water employed and the conditions of operation being such as to yield soluble lime-sulfur compounds in concentrated condition showing forty degrees Baumé or higher adapted for dilution to suitable spraying strength.

6. As a new article of manufacture, an insecticidal composition comprising soluble lime-sulfur compounds in highly concentrated condition showing forty degrees Baumé or higher and substantially free of insoluble matter, said composition being adapted for dilution to suitable spraying strength.

7. As a new article of manufacture, an insecticidal composition comprising soluble basic insecticidal compounds of the sulfid and polysulfid type in admixture with water present in quantity not substantially greater than required to render the mixture of pasty consistency, said composition being substantially free of insoluble matter.

8. As a new article of manufacture, an insecticidal composition of pasty consistency comprising soluble calcium sulfids and calcium thiosulfate only, said composition being substantially free of insoluble matter, and adapted for dilution to suitable spraying strength.

ADOLPH D. FEST.

Witnesses:
MARY F. LINCOLN,
LUTHER JOHNS.